United States Patent [19]

Myles

[11] 4,287,266
[45] Sep. 1, 1981

[54] SOLAR SELECTIVE FILM AND PROCESS

[75] Inventor: James M. Myles, East Northport, N.Y.

[73] Assignee: Grumman Aerospace Corp., Bethpage, N.Y.

[21] Appl. No.: 92,458

[22] Filed: Nov. 8, 1979

Related U.S. Application Data

[63] Continuation of Ser. No. 865,298, Dec. 28, 1977, abandoned.

[51] Int. Cl.³ .......................... F24J 3/02; B32B 15/04; B32B 15/18; B32B 15/20
[52] U.S. Cl. .................................. 428/596; 428/344; 428/447; 428/469; 428/629; 428/632; 428/652; 428/667; 428/675; 428/679; 428/680; 428/686; 428/687; 428/913
[58] Field of Search ................ 428/652, 667, 675, 679, 428/680, 686, 687, 596, 333, 344, 447, 450, 469, 913, 629, 632; 126/418, 440, 441, 901

[56] References Cited

U.S. PATENT DOCUMENTS

| | | | |
|---|---|---|---|
| 1,124,114 | 1/1915 | Davis et al. | 156/233 |
| 1,731,415 | 10/1929 | Grupe | 156/233 |
| 2,543,800 | 3/1951 | Palmquist et al. | 350/105 |
| 2,917,817 | 12/1959 | Tabor | 126/271 |
| 3,129,703 | 4/1964 | Tabor | 126/270 |
| 3,176,678 | 4/1965 | Langley | 126/270 |
| 3,176,679 | 4/1965 | Langley | 126/270 |
| 3,253,971 | 5/1966 | Garling | 350/105 |
| 3,645,600 | 2/1972 | Doctoroff et al. | 350/290 |
| 3,776,805 | 12/1973 | Hansen | 428/913 |
| 3,810,777 | 5/1974 | Boebel | 427/168 |
| 3,920,413 | 11/1975 | Lowery | 126/271 |
| 3,936,567 | 2/1976 | Vesely | 428/343 |
| 4,043,318 | 8/1977 | Pei | 126/270 |
| 4,055,707 | 10/1977 | McDonald | 126/270 |
| 4,077,943 | 3/1978 | Sato et al. | 428/447 |
| 4,088,547 | 5/1978 | Albertson | 126/270 |
| 4,105,822 | 8/1978 | DeJong | 126/270 |

OTHER PUBLICATIONS

N.A.S.A. Tech. Brief LEW-12614 (Apr. 1976), one page only.

Primary Examiner—William J. Van Balen
Attorney, Agent, or Firm—Morgan, Finnegan, Pine, Foley & Lee

[57] ABSTRACT

A continuous film having a solar selective coating on one surface and adhesive on the opposite surface is produced by a coil type process. The film may be cut to size and shape for application to solar collectors.

5 Claims, 3 Drawing Figures

4,287,266

SOLAR SELECTIVE FILM AND PROCESS

This is a continuation, of application Ser. No. 865,298 filed Dec. 28, 1977 now abandoned.

FIELD OF INVENTION

This invention relates to the field of solar energy and more particularly to collectors having solar selective coatings.

BACKGROUND

A solar selective coating is a coating or series of coatings applied to a substrate that will absorb ninety (90) percent plus of the solar radiation and emit less than thirty (30) percent of the infra-red radiation in the range of 0.3 to 1.9 microns. In contrast non-solar selective coatings absorb and emit 90 to 95 percent of the solar radiation.

Although much work has been done in the area of solar selective coating development, the processes of application have involved bringing of the solar array (collector) surfaces into the application procedures. For example, where the coating is painted, the solar arrays had to be painted and baked. Where the coatings were vacuum plated, electro or electroless plated or chemically converted, the solar array had to be subject to a number of cleaning, pretreatment and finish cycles in chambers or paths. The number of process cycles will vary with the type of substrate and solar selective coating that was applied, but in each instance the solar collecting surfaces are intrinsic to the application processing.

Various approaches to solar selective coatings, solar energy collectors, light reflective films are discussed in the prior art. See, for example, the following U.S. Pat. Nos., Palmquist et al., 2,543,800; Tabor, 2,917,817 and 3,129,703; Langley, 3,176,678 and 3,176,679; Garling, 3,253,971; Doctoroff et al., 3,645,600; Boebel et al., 3,810,777; Lowery, 3,920,413; and Vesely, 3,936,567; also, N.A.S.A. Tech Brief LEW-12614 (April 1976). Plating processes of interest to the process of the present invention are shown in Davis, U.S. Pat. No. 1,124,114 and Grupe U.S. Pat. No. 1,731,415.

SUMMARY

The present invention is directed to providing solar selective surfaces for collector elements or arrays without the necessity of subjecting the collector element to complex application procedures and protecting the solar selective surface integrity.

The premise of solar selective coating of this invention is to fabricate a metallic foil strip or web of suitable thickness and width to which on a continuous process the solar selective coating is applied using coil coating techniques. The applied solar selective coating can, in the case of some metallic finishes, be coated with a micro thin barrier coating containing a corrosion inhibitor. The side opposite the functional surface of the foil is coated with a pressure sensitive adhesive capable of withstanding 500° F. and appropriate interleaving release film. The end item can be packaged on rolls or in pre-cut flat form.

The solar selective coated foil can then be shipped to any site where solar collector panels are being installed or assembled. The solar selective coated foil can then be trimmed to size and applied directly to the collector surface substrate using a suitable means to assure intimate contact between foil and collector surface.

This process is applicable to all metallic foil substrates and can be used to apply coatings by electrostatic, electroplate, vacuum deposition, chemical conversion, immersion etc., by modification of stations in foil coating line.

In addition to being applied to new solar array collector surfaces as a selective coating, this precoated foil also lends itself to the following applications:

(a) Retrofit of existing solar collector having nonselective coatings.
(b) Repair of solar selective coatings that have sustained damage.
(c) Use of multiple solar selective coatings on the same collector panel to satisfy design requirements.

DETAILED DESCRIPTION

Figure 1:
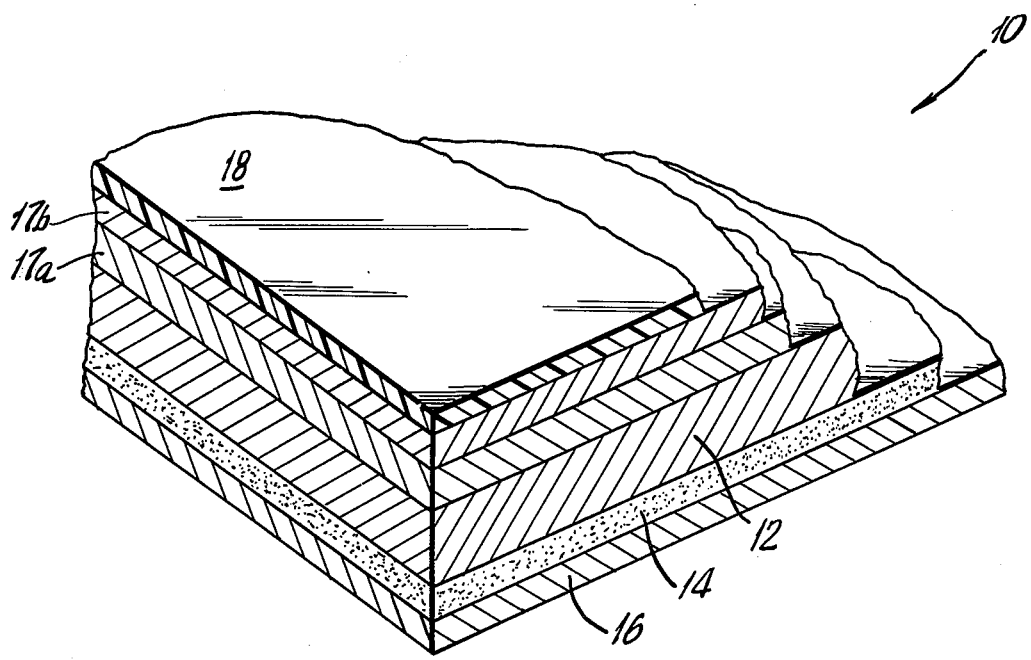
FIG. 1 is a sectional perspective view of a solar selective film of the present invention.
Figure 2:
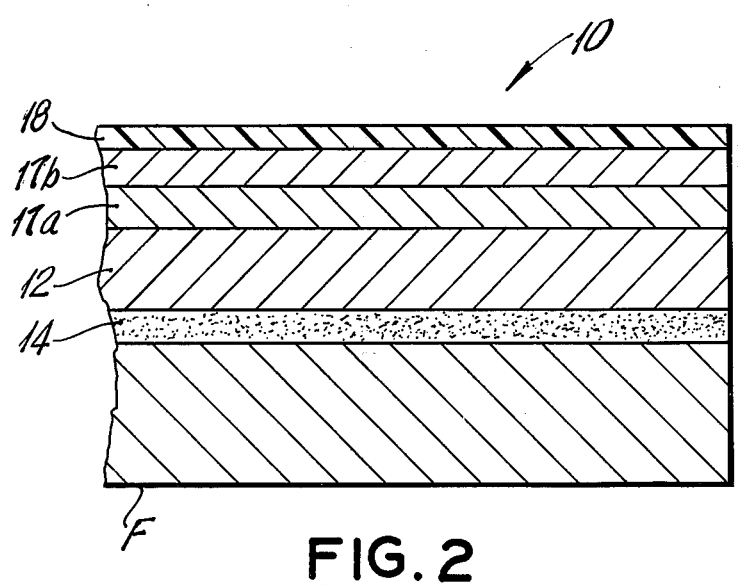
FIG. 2 is a cross-sectional perspective view of the film of FIG. 1 affixed to a collector element.

FIG. 1 shows a portion of a solar selective film 10 which is a composite structure. Film 10 is a flexible continuous strip which may be affixed to a solar collector element F, FIG. 2, to provide the selective absorption of solar radiation.

Film 10 includes an intermediate metallic layer 12, such as copper, nickel, aluminum or steel. Copper is a preferred metal due to its high thermal conductivity. Copper layer 12 may be a foil structure or electroformed copper. A typical thickness for layer 12 is about 1.4 mils.

To enable film 10 to be attached to a collector element the surface of layer 12 which will abut the collector is coated with an adhesive 14. Preferably, adhesive 14 is a pressure sensitive adhesive capable of withstanding temperatures in the range of 500°-800° F. A suitable pressure sensitive adhesive is sold by Dow Corning Co. under the designation 280 A pressure sensitive adhesive. The exposed surface of adhesive 14 is covered by release sheet 16 which may be manually removed when the film is to be attached to the collector F.

The surface of layer 12 remote from the adhesive 14 is provided with a solar selective coating 17 which is illustrated as two layers 17a and 17b. Layer 17a is a bright metallic layer such as electroplated white chrome or white nickel and layer 16b is a solar selective layer of electroplated black chromium. Layer 17a has a thickness in the range of 1/10 to 1/4 mil., while layer 17b has a thickness in the range of 800 to 1600 A. The combination of layers 17a and 17b provides solar selective absorption in the range of about 90–95% and emissivity in the range of about 8–15%.

In order to prolong the useful life of the solar selective coating 17, it is desirable to overcoat layer 16 with a micro thin layer 18 containing a corrosion inhibitor. A suitable material for layer 18 is polysiloxane, such as that sold by Hughson Chemical Company under the designation Chemglaze R-104. Layer 18 may have a thickness of about 1/10 mil. while providing protection for the solar selective coating 17.

Figure 3:
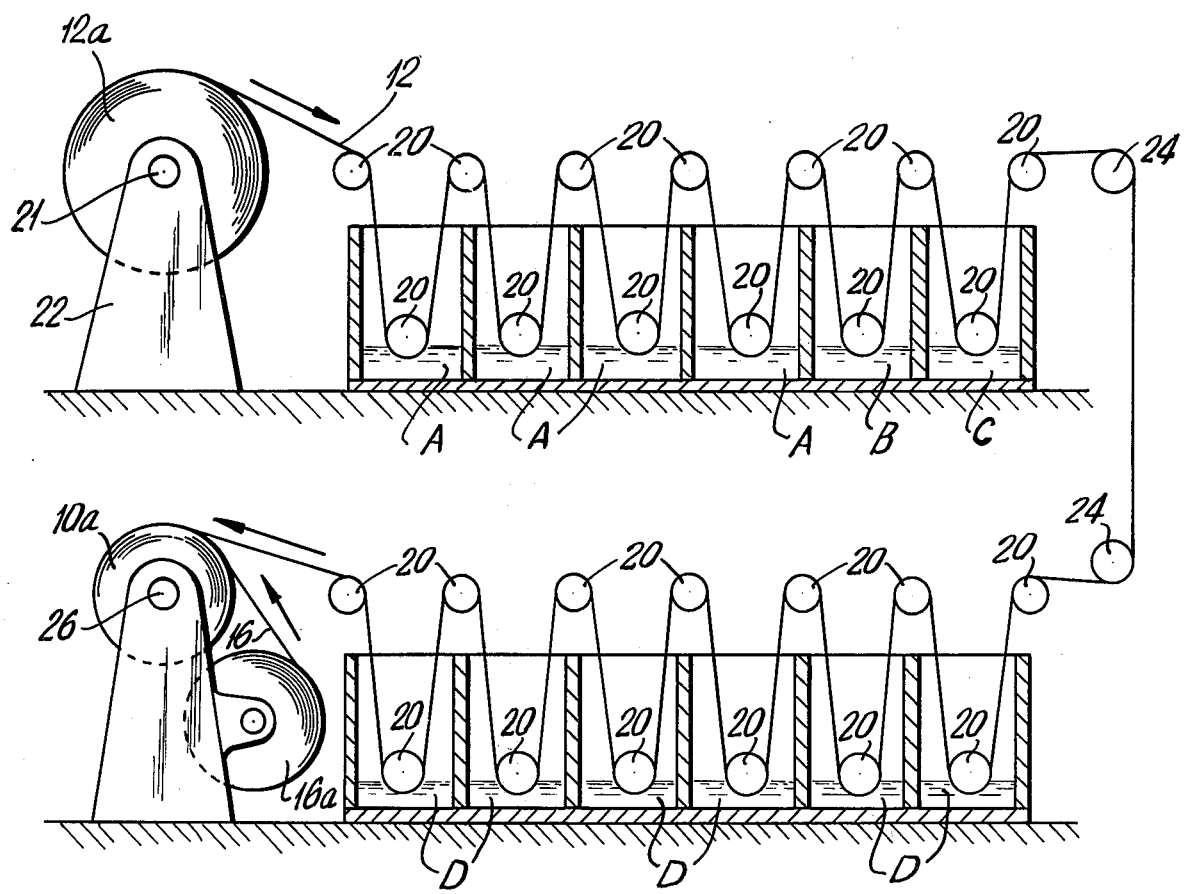
FIG. 3 is a process flow diagram of the method for producing the solar selective film in a continuous coil-type process.

One of the features of the solar selective film 10 is that it may be fabricated in a continuous process using a coil coating process to provide a continuous length of solar selective film. FIG. 3 illustrates schematically a continuous coil process wherein a metallic foil 12 is provided from a roll 12a to a process path defined by a plurality of rollers 20. Roll 12a may be of any convenient width and is rotatably carried on an axle 21 supported by a pair of frame members 22 (only one of which is illustrated).

Rollers 20 direct the foil 12 along a first process path defined by process baths A, B, and C wherein the surface of the foil is coated with a solar selective coating and barrier film. For example, baths A electroplate a white chromium or white nickel coating 17a directly on foil 12, and bath B electroplates a black chromium layer 17b on to layer 17b. Finally, bath C deposits a polysiloxane layer 18 on black chromium layer 17b to complete the coating on one surface of foil 12.

After one surface of foil 12 has been coated the foil is passed over a pair of reversing rollers 24 and directed along a second process path through treatment vats D wherein the pressure sensitive adhesive 14 is applied to the opposite surface of the foil. As the foil web leaves the last vat, it is wound onto a roll 10a which is carried on axle 26. As the web is wound, release sheet web 16 is interwound from roll 16a onto the surface of the adhesive 14 to produce a continuous composite film of the type shown in FIG. 1.

Alternative solar selective films include the provision of an aluminum foil substrate which is coated in a white brass process (zinc and copper) and dipped in nitric acid. Similarly, electroplatable plastic film may be used for the substrate with a copper coating electroplated thereon. In that case, white chrome or white nickel is electroplated on the copper followed by black chrome.

These and other modifications may be made to the present invention without departing from the scope and spirit thereof. It will be recognized that the provision of a continuous film of solar selective material which may be cut to size and shape for application to existing solar collectors or newly produced collectors reduces the overall complexity and cost associated with solar energy absorber manufacture and maintenance.

When film 10 is to be applied to a collector, it is cut to size and shape. The release sheet 16 is removed to expose the adhesive layer 14 and the film is applied to the collector F. The film may be installed on the collector in the field, thereby militating against damage to the solar selective surface prior to erection of the collector.

Differences in the thermal coefficient of expansion for film 10 and collector F may produce wrinkling and may require relief by cutting expansion slots into the film after it is installed. Relief incisions may be made with a cutting instrument, e.g. knife, and be oriented perpendicularly to the primary thermal expansion direction. The incision should be alternated to produce a tortuous, ladder-like array, thereby fixing the film in the collector while allowing limited expansion.

These and other modifications may be made by those skilled in the art without departing from the scope and spirit of the present invention as pointed out in the appended claims.

What is claimed is:

1. A composite, flexible, solar selective film for use with a solar collector comprising:
   - a metallic substrate selected from the group consisting of copper, nickel, aluminum and steel, said substrate having opposite major surfaces;
   - a solar selective coating on one of said major surfaces, said coating having a first layer selected from the group consisting of white chromium and white nickel and having a thickness in the range of 1/10 to ¼ mil and a second outer layer of black chromium having a thickness in the range of 800 to 1600 Angstrom units;
   - a barrier layer on the surface of said selective coating, said barrier layer containing a corrosion inhibitor; and
   - adhesive means on the other of said major surfaces for affixing said substrate to said solar energy collector, said adhesive means being capable of withstanding temperatures in the range of 500 to 800° F., said film having slots to accommodate thermal expansion, said slots being a tortuous, ladder-like array, oriented perpendicularly to the primary thermal expansion direction.

2. A solar energy selective film of claim 1, wherein said substrate is copper foil.

3. A solar energy selective film of claim 2, wherein said copper is about 1.4 mils in thickness.

4. A solar energy selective foil of claim 3, wherein said adhesive means is pressure sensitive adhesive.

5. A solar energy selective film of claim 1, wherein said barrier layer is polysiloxane.

* * * * *